United States Patent
Hellenbrand et al.

(10) Patent No.: US 9,296,569 B2
(45) Date of Patent: Mar. 29, 2016

(54) METHOD FOR RETRIEVING MEDICATION PACKAGES

(71) Applicant: CareFusion Germany 326 GmbH, Kelberg (DE)

(72) Inventors: Christoph Hellenbrand, Kaifenheim (DE); Andreas Klapperich, Rieden (DE); Dennis Reif, Kaisersesch (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 48 days.

(21) Appl. No.: 14/375,778

(22) PCT Filed: Jan. 24, 2013

(86) PCT No.: PCT/EP2013/051302
§ 371 (c)(1),
(2) Date: Jul. 30, 2014

(87) PCT Pub. No.: WO2013/113604
PCT Pub. Date: Aug. 8, 2013

(65) Prior Publication Data
US 2014/0377050 A1 Dec. 25, 2014

(30) Foreign Application Priority Data

Jan. 30, 2012 (EP) ..................... 12153133

(51) Int. Cl.
*B65G 47/90* (2006.01)
*B65G 1/04* (2006.01)

(52) U.S. Cl.
CPC ............... *B65G 47/905* (2013.01); *B65G 1/04* (2013.01); *B65G 1/0421* (2013.01)

(58) Field of Classification Search
CPC ........ B65G 1/026; B65G 1/04; B65G 1/0421; B65G 47/905; B65G 2203/0283; B65G 2203/042; B65G 2203/044
USPC .......... 414/270, 273, 275, 280, 807, 277, 281
See application file for complete search history.

(56) References Cited

U.S. PATENT DOCUMENTS

| 3,557,977 A | * | 1/1971 | Atwater | ............... B65G 1/0421 250/224 |
| RE27,871 E | * | 1/1974 | O'Connor | ............ B65G 1/0421 414/273 |

(Continued)

FOREIGN PATENT DOCUMENTS

| DE | 102005063197 A1 | 7/2007 |
| EP | 1619148 A1 | 1/2006 |

(Continued)

*Primary Examiner* — Kaitlin Joerger
(74) *Attorney, Agent, or Firm* — McDermott Will & Emery LLP (57) ABSTRACT

The present invention relates to a method for retrieving medication packages from a pharmacy order-picking device. In the method according to the invention, an operating device is displaced in a displacement position to a predetermined shelf position, at least one medication package on a shelf belonging to the shelf position is moved with a gripping device in the direction of a support and it is then checked whether the at least one medication package has moved fully onto the support. If the check has a negative outcome, an edge of the shelf on which the at least one medication package is stored is detected with a sensor of the operating device and said operating device is displaced to a corresponding shelf position, the gripping device having been brought into the displacement position before displacement.

20 Claims, 6 Drawing Sheets

(56) References Cited

U.S. PATENT DOCUMENTS

| | | | | |
|---|---|---|---|---|
| 6,923,612 | B2* | 8/2005 | Hansl | B66F 9/07 414/277 |
| 7,341,187 | B2* | 3/2008 | Murayama | B65G 1/0421 235/385 |
| 8,740,542 | B2* | 6/2014 | Wolkerstorfer | B65G 1/0435 414/280 |
| 8,790,061 | B2* | 7/2014 | Yamashita | B65G 1/0492 414/280 |
| 9,056,719 | B2* | 6/2015 | Tanahashi | B65G 1/0421 |
| 2005/0036858 | A1* | 2/2005 | Ueda | B65G 1/0435 414/280 |
| 2008/0044262 | A1 | 2/2008 | Kim et al. | |
| 2010/0300041 | A1* | 12/2010 | Kim | G07F 11/165 53/281 |
| 2013/0142600 | A1* | 6/2013 | Ogawa | B65G 1/0492 414/277 |
| 2015/0104278 | A1* | 4/2015 | Von Liechtenstein | B65G 1/0435 414/277 |
| 2015/0203294 | A1* | 7/2015 | Yamada | B65G 1/0407 294/81.6 |
| 2015/0210472 | A1* | 7/2015 | Nakamura | B65G 1/0407 414/661 |

FOREIGN PATENT DOCUMENTS

| | | |
|---|---|---|
| FR | 2608567 A1 | 6/1988 |
| JP | S5826702 A | 2/1983 |

* cited by examiner

METHOD FOR RETRIEVING MEDICATION PACKAGES

CROSS-REFERENCE TO RELATED APPLICATION

This application is the U.S. National Phase under 35 U.S.C. §371 of International Application No. PCT/EP2013/051302, filed on Jan. 24, 2013, which claims the benefit of EP 12153133.9, filed Jan. 30, 2012. The entire contents of these applications are incorporated by reference herein.

BACKGROUND

In some pharmacy order-picking devices, a large number of various and differently-dimensioned medication packages (piece goods) are stored chaotically and in a space-optimized manner on elongated shelf bases. These shelf bases form, together with the shelf walls, a plurality of shelf compartments, wherein a large number of medication packages is stored per shelf compartment, i.e., per shelf base.

The shelf bases typically consist of glass and are suspended in the shelf walls. The total weight of the medication packages stored per shelf space can vary strongly because of the multiplicity of the medication packages placed per shelf base and the space-optimized manner of the storage. The shelf bases are designed such that they only sag minimally if they are occupied with medication packages of average weight, whereby a retrieval with the aid of the operating device is not disturbed.

To retrieve the medication packages, the operating device is moved to a specific shelf position which is known to a control device of the pharmacy order-picking device. In the case of normal occupation of the shelf base, in this shelf position, the support surface of the support of the operating device is approximately aligned horizontally with the surface of the shelf base, so that the medication package to be retrieved or the medication packages to be retrieved can be moved using the gripping device without problems from the shelf base onto the support. The gripping device or the gripper includes clamping jaws, using which the medication package(s) is/are clamped and then moved onto the support. The gripping device can furthermore include a vacuum suction unit, using which medication packages can be moved onto the support. The vacuum suction unit can be used together with the clamping jaws or without them in dependence on the type of the medication package.

SUMMARY

If a shelf base is occupied with an excessively high number of relatively heavy medication packages, the shelf base sags so strongly because of the material that the surface of the shelf base, when the operating device is moved to the shelf position (target position) provided for the shelf base, no longer horizontally aligns with the support surface of the support. If a medication package is moved from the shelf base onto the support in such a case, the end side or end face of the support can form a stop in the extreme case, which prevents a further movement of the medication package onto the support, so that the desired medication package cannot be retrieved from the pharmacy order-picking device.

The present disclosure relates to a method for retrieving medication packages. In particular, the present disclosure relates to a method for retrieving medication packages from a pharmacy order-picking device having at least one row of shelves having in each case a plurality of shelf bases extending in a horizontal direction and a plurality of shelf walls extending in a vertical direction, at least one operating device which is movable horizontally and vertically in front of the row of shelves, wherein the operating device includes a gripping device or a gripper for storing and/or retrieving medication packages on or from the shelf base, a sensor, and a support having a support surface.

The object of the present disclosure is therefore to provide a method for retrieving medication packages from a pharmacy order-picking device, in which the retrieval is also possible from shelf bases equipped with particularly heavy medication packages.

The pharmacy order-picking device, in which a method described herein is applicable, includes at least one row of shelves having in each case a plurality of shelf bases extending in a horizontal direction (X direction, X axis) and a plurality of shelf walls extending in a vertical direction (Z direction, Z axis), wherein the shelf bases and the shelf walls form a plurality of shelf compartments. The pharmacy order-picking device furthermore includes at least one operating device, which is movable horizontally and vertically in front of the row of shelves, wherein the operating device itself includes a gripping device or a gripper for storing and/or retrieving medication packages on or from the shelf base, a sensor, and a support having a support surface.

The gripping device can include a jaw gripper having longitudinally-adjustable clamping jaws and/or a suction gripper (the actual gripping units). The support can be implemented, for example, as a simple support table, as guide rails, or as a conveyor belt. The sensor can be arranged below the support or above the support, wherein the arrangement of the sensor favors specific embodiments of a method described herein.

In a method described herein, the operating device is firstly moved via an arrangement made of a horizontal guide and a vertical guide to a predefined shelf position, wherein the gripping device is located in this case in a movement setting, in which the actual gripping units (clamping jaws, suction grippers) are positioned such that a free unit of the operating device within the pharmacy order-picking device is possible. Under "normal conditions," the shelf position is selected so that the surface of the shelf base, from which the medication packaging is to be retrieved, is aligned horizontally with or is arranged slightly higher than (for example, 1 mm) the support surface of the support of the operating device. In the scope of this application, the term "medication package" is to be interpreted as "at least one medication package"; this is also to comprise the retrieval of a plurality of (successively) stored medication packages.

As soon as the shelf position is approached, the medication package on the shelf base associated with the shelf position is moved in the direction toward the support using the gripping device. How this occurs precisely is not essential in the case of a method described herein. If a jaw gripper is used, the medication package is clamped using the clamping jaws and drawn onto the support. The movement onto the support can be assisted by the suction gripper or also can be carried out solely by the suction gripper.

It is checked whether the medication package is moved completely onto the support. This check can accompany the movement of the medication package onto the support, i.e., it can be carried out simultaneously with the movement. This can be checked, for example, using an additional sensor of the gripping device.

Alternatively, after ending a movement sequence, which is necessary under "normal" circumstances (i.e., without a disturbance of the movement from the shelf base onto the support) for the movement of the medication package onto the support, it can be checked whether the at least one medication package has been moved completely onto the support. If so, the medication package can be transported using the operating device to the delivery point of the pharmacy order-picking device.

However, if the check has a negative result, i.e., the medication package has not been moved completely onto the support, an edge (top edge or bottom edge) of the shelf base, on which the medication package is stored, is ascertained using the sensor of the operating device and the operating device is moved to a correspondingly corrected shelf position (at which retrieval can be performed without problems), wherein the gripping device was moved into the movement setting before the movement. This can occur, for example, during the (attempted) movement of the medication package onto the support. If the gripping units of the gripping device have not been completely retracted during the movement of the medication package in the direction onto the support, the gripping units are completely refracted (movement setting) before the movement of the operating device to the corrected shelf position, so that a free movement of the operating device is possible.

In this corrected shelf position, the surface of the shelf base and the support surface of the support are aligned in relation to one another such that a problem-free movement from the shelf base onto the support is possible, without the end face of the support forming a stop for the medication package. The shelf position is typically selected such that the surface of the shelf base is aligned horizontally with the support surface of the support or the support surface of the support is arranged slightly below the surface of the shelf base.

The concept of the sensor is to be understood in the scope of this application as a distance sensor having a unit for emitting measurement beams and for receiving measurement beams, wherein the two units can be combined into one unit. During the distance determination, the sensor can detect the direction or runtime of an actively emitted signal which is reflected on a surface (of a medication package or a component of the pharmacy order-picking device). The distance determination can also be carried out capacitively or on the basis of the parallax or a stereo image of an electronic camera, however.

In pharmacy order-picking devices, laser distance sensors, which operate according to the principle of laser triangulation, are typical. In this case, a laser beam is oriented onto a surface (see above) and observed using the receiving unit (for example, camera, photodiode, diode array) located in the sensor. If the distance of the surface from the sensor changes, the angle at which the light spot is observed, and therefore the position of the image on the receiver of the receiving unit, also changes. For example, if a diode array is used, the diode which detects the reflected light beam changes with the distance. The distance of the surface from the sensor can be calculated from the position change.

For reasons of cost, the distance measurement is generally carried out as a "single-point measurement." That is, the measurement beam is emitted at a constant angle and is incident, without movement of the operating device, on the same point (single point). The reflected beam is typically detected using a diode array.

The distance measurement can be carried out in this case so that only the detection at a specific diode (or a diode bundle) of the array is differentiated from the detection outside this diode or the diode bundle. The distance measurement then only recognizes two states ("binary distance measurement" hereafter).

In a method described herein, it is ensured that a retrieval can be carried out in spite of a sagging shelf base. If it is established that the movement of the medication package onto the support cannot be carried out, the actual position or the actual value (in relation to the Z axis) of an edge (top edge or bottom edge) of the shelf base is ascertained using the sensor. In the event of sagging of the shelf base, this actual position deviates from the target position; the operating device (and therefore the support) is effectively "positioned" excessively high for a retrieval of the medication package. The operating device is then moved vertically by a value corresponding to the deviation, so that the retrieval is possible without problems.

As already indicated, the sensor of the operating device can be arranged above or below the support. Because of this arrangement within the operating device, various alternative embodiments are conceivable or preferable.

If the sensor is positioned above the support, the ascertainment of the top edge of the shelf base, on which the medication package is stored, and the movement of the operating device to a corresponding shelf position can be carried out such that the operating device is firstly moved horizontally, until the sensor detects a region adjacent to the medication package to be retrieved.

If a laser distance sensor is used, for example, the sensor continuously detects the distance to the non-retrieved medication package. If this package ends, the distance increases suddenly; the sensor then either detects the distance to the shelf back wall (this is known) or to a medication package located farther back. The shelf base is not occupied in the region adjacent to the medication package as a result of the required spacing of the medication packages from one another (in relation to the X axis of the shelf compartments or the shelf bases). If only a "binary" distance measurement is carried out, when the measurement beam is guided over the end of the non-retrieved medication package, the "state" (0/1) changes because of the sudden change of the distance and the change thus caused of the detecting diode or the detecting diode bundle.

The operating device is then moved downward at this position until a signal characterizing the top edge of the shelf base is ascertained using the sensor (if a laser distance sensor is used, the sudden change of the distance between shelf back wall/rear medication package and top edge or end side of shelf base again; in the case of "binary" distance measurement, state change again). As soon as the characterizing signal is ascertained, the operating device is moved to a corresponding shelf position, at which the medication package can be retrieved.

In another method, a bottom edge of the shelf base is ascertained and the operating device is moved to a corresponding shelf position, by moving the operating device vertically until a signal characterizing the bottom edge of the shelf base is ascertained using the sensor. The operating device is then moved to a correspondingly corrected shelf position, at which the medication package is retrieved. How the operating device is to be moved along the Z axis results from the known thickness of the shelf base and the construction of the operating device (arrangement of sensor to support surface). Depending on whether the sensor is arranged above or below the support in the operating device, the operating device is moved upward (sensor below the support) or downward (sensor above the support) along the Z axis.

In a further alternative embodiment of a method described herein, in which the sensor can again be arranged below or above the support, an edge (top edge/bottom edge) of the shelf base is ascertained and the operating device is moved to a corresponding shelf position, by firstly ascertaining an actual position of the edge of the shelf base using the sensor, comparing the actual position to a target position, and vertically moving the operating device by a value corresponding to the ascertained deviation.

In the case of this movement control, it is thus firstly ascertained using the sensor by which value the shelf base is offset downward, and the operating device is subsequently moved by a corresponding value, so that a retrieval from the sagging shelf base is possible without problems.

In contrast to an above-mentioned variant of the method, in this embodiment, the operating device does not first have to be moved in the horizontal direction to ascertain the actual position of the top edge of the shelf base. This has the advantage that this method variant can be carried out more rapidly. However, the demands placed on the sensor system are greater. Either a two-dimensional or three-dimensional distance measurement is carried out or the sensor for the single point measurement is pivotable or rotatable about the horizontal axis, wherein the sudden distance change or "flank" (medication package/shelf back wall; shelf back wall/glass base) is not usable as a characteristic signal, if the sensor is not also pivotable or rotatable about the vertical axis. In this method, other characteristic signals can optionally be analyzed; for example, the front edge of the shelf base can have a special coating, which is recognized by a corresponding sensor. However, details with respect to the sensor system are not essential for the present application; rather, a signal characterizing the actual position of the top edge of the shelf base (and therefore of the shelf base itself, of course) is ascertained using the sensor.

After the ascertainment of the edge of the shelf base, the operating device is moved to a correspondingly corrected shelf position. The shelf position is selected such that a movement of the medication package from the glass base onto the support is possible. For this purpose, the support surface of the support of the operating device is to be aligned to the surface of the shelf base, on which the medication package is stored. To carry out the retrieval as rapidly as possible and without damage, it is preferable for the operating device to be moved such that the support surface of the support is aligned horizontally with or is arranged lower by an amount Z than the shelf base surface of the shelf base on which the medication package is stored. A typical value for Z is 1 mm in this case, wherein a greater value for Z can also be used, if the composition of the support allows this.

In the course of the method, it is checked whether the medication package is moved completely onto the support. Such a check is carried out in a preferred embodiment such that the length of the medication package moved onto the support is ascertained using a sensor and is compared to a target value, which is stored in a control unit of the pharmacy order-picking device, wherein a deviation from a target value indicates that the medication package was not moved completely onto the support. The length of the medication package can be ascertained in this case, for example, so that at known movement velocity of the medication package onto the support, the interruption duration of a light barrier, for example, is ascertained. Alternatively, a contact sensor can be arranged on the support, which measures the contact duration at known movement velocity of the medication package, or ascertains whether the context sensor is released again after ended movement of the medication package onto the support. In the latter case, this would mean that the movement sensor is arranged in the vicinity of the front edge of the support. The two above-mentioned embodiments allow a reliable and cost-effective check.

The gripping units of the gripping devices comprise a drive, which is responsible for the movement of the gripping units into or out of the shelf compartment. The drive includes positioning regulators, which continuously report their actual position. In the case of predefined actual position of the drive or the positioning regulators, it can alternatively be checked using the sensor whether the medication package was moved onto the support.

In one embodiment of the method, the operating device, after it has been moved horizontally into the region adjacent to a medication package, is moved downward until a signal characterizing the top edge of the shelf base is ascertained using the sensor. The operating device is subsequently then moved to a shelf position in front of the medication package and the medication package is retrieved. This embodiment of the method can be expanded such that after the ascertainment of a signal characteristic for the top edge of the shelf base, the operating device is moved farther downward, ascertains a signal characteristic for the bottom edge, a plausibility check is carried out on the basis of the ascertained signals, and, if the plausibility check is positive, the operating device is then moved to the shelf position at which the medication package can be retrieved.

During the plausibility check, it is checked whether the thickness of the shelf base ascertained on the basis of the characteristic signals for the top edge and the bottom edge of the shelf base corresponds to a target value. If this is not the case, in the event of previous horizontal movement of the operating device, it is not moved to a point at which a medication package is no longer arranged on the top edge of the shelf base. The above-mentioned embodiment of the method increases the reliability during the retrieval of medication packages.

In a further preferred embodiment, the operating device, after it has been established that the medication package was not moved completely onto the support, can be moved upward again until the top edge of the medication package to be retrieved is ascertained using the sensor. The sag of the shelf base may be ascertained on the basis of the known package height. As soon as the top edge of the medication package has been ascertained, the operating device is moved downward again for the retrieval of the medication package.

In a preferred embodiment of the method, in which the sensor is arranged below the support, if the check as to whether the medication package has been moved completely onto the support has a negative result, the medication package is moved away from the support using the gripping device such that the at least one medication package has no contact with the end face of the support. If the gripping device includes a vacuum suction unit, the medication package can be pushed away from the top edge into the shelf compartment. Alternatively, the medication package can be pushed using the clamping jaws of the gripping device into the shelf compartment. In a further embodiment, the operating device can comprise a pusher, using which the medication package can be pushed back. If the medication package has been pushed back, the operating device can be moved upward without the location of the medication package being changed by the support.

In a further preferred embodiment of the method, the medication package is moved using the gripping device away from the support such that the top edge of the shelf base is released before the gripping device is moved into the movement setting. If the medication package has been pushed, the operating device is moved downward until a signal characterizing the top edge of the shelf base is ascertained using the sensor.

Finally, the operating device (if necessary at all) is moved to a shelf position at which the medication package is retrieved.

Alternatively, the pharmacy order-picking device includes at least one row of shelves having in each case a plurality of shelf bases extending in a horizontal direction and a plurality of shelf walls extending in a vertical direction, and at least one operating device which is movable horizontally and vertically in front of the row of shelves, wherein the operating device includes a gripping device for storing and/or retrieving medication packages on or from the shelf base, a sensor, and a support having a support surface, wherein the sensor is arranged below the support in the operating device.

In the alternative method, the operating device is moved in a movement setting to a predefined shelf position, at which the at least one medication package is to be retrieved. If the shelf base corresponding to the shelf position is "normally" occupied, and no sagging as a result of an occupation with numerous heavy medication packages is present, the at least one medication package can be retrieved at this shelf position.

As soon as the shelf position is reached, the distance $A_I$ from the sensor to the bottom side of the shelf base is ascertained using the sensor, the distance $A_I$ is compared to a target value $A_S$ for the distance between the sensor and the bottom side of the shelf base, and if a deviation which exceeds a limiting value is present between the ascertained distance $A_I$ and the target value $A_S$, the operating device is moved vertically by a corresponding amount to a corrected shelf position and the at least one medication package on the shelf base associated with the shelf position is moved in the direction of the support using the gripping device.

In contrast to the above-mentioned method, in the alternative solution, it is first checked whether the alignment of the operating device to the shelf base from which retrieval is to be performed is correct. For this purpose, the distance sensor/bottom side of shelf base is measured and compared to a target value. If no deviation exists, the support surface and the surface of the shelf base are horizontally aligned such that a movement of the medication package can be carried out without problems. If a deviation exists, it is ascertained on the basis of this deviation (and the knowledge about the precise construction of the row of shelves and the operating device) how far the operating device may be moved vertically (generally downward) to reach a suitably corrected shelf position for the retrieval.

Methods will be described in greater detail hereafter on the basis of preferred embodiments illustrated in the drawing, wherein only a section of a pharmacy order-picking device having operating device is schematically illustrated.

DETAILED DESCRIPTION

FIGS. 1a-1f illustrate an embodiment of a method, wherein the structural features of the pharmacy order-picking device are only schematically shown. The embodiment shown here is suitable for operating devices in which the sensor 23 is installed above the support 21.

In some methods, the operating device 20 is first moved in a movement setting, in which gripping units 22' (clamping jaws here) of the gripping device 22 are arranged such that a free movement of the operating device 20 in the pharmacy order-picking device is possible, to a predefined shelf position. The predefined shelf position is illustrated in FIGS. 1a-1d. The predefined shelf position represents a position, in which medication packages can be retrieved without problems in the case of a "normal" occupation of a shelf base; this shelf position is stored in a control unit (not shown) of the pharmacy order-picking device.

Figure 1A:
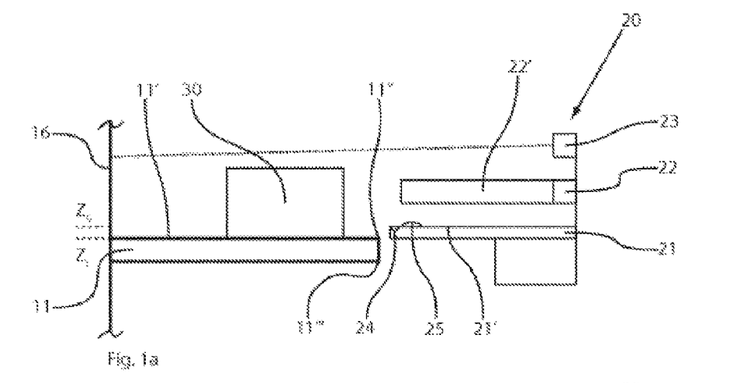
FIGS. 1a-1f show an embodiment of a method according to the disclosure.
Figure 1B:
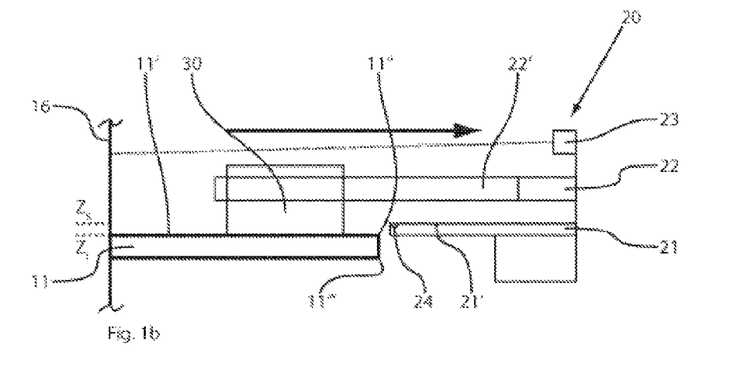

The shelf base 11 shown in FIGS. 1a-1f, as a result of loading with a high number of heavy medication packages, sags downward, so that the surface 11' of the shelf base 11 does not align horizontally with the support surface 21' of the support 21 of the operating device 20. Since the medication packages are only deposited in a space-optimized manner on the shelf base, however, no items of information about (possible) sagging of the shelf base 11 are provided to the control unit. After the positioning of the operating device 20 (if it is assumed that a normal retrieval is possible), gripping units 22' of the gripping device 22 are pushed into the shelf compartment toward the shelf rear wall 16 and the medication package 30 is gripped (FIG. 1b).

Figure 1C:
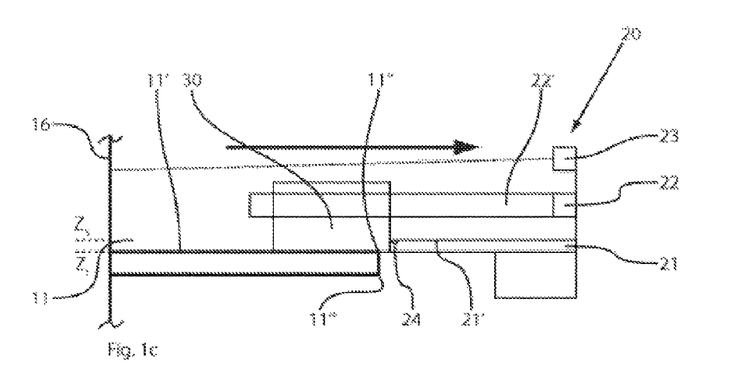

In the embodiment shown, a clamping gripper is used, so that the medication package 30 is clamped using the gripping units 22' and subsequently moved on the shelf base 11 toward the support 21 of the operating device. As a result of the sagging of the shelf base 11, the end side or end face of the support 21 forms a stop for the medication package 30, as can be seen in FIG. 1c. The stop formed by the end side or end face of the support 21 prevents the medication package 30 from being able to be moved using the gripping device onto the support 21. This is checked using a sensor 24, 25. The sensor 24 is an optical sensor which checks whether the medication package 30 has been moved completely past it. This may be ascertained, for example, on the basis of the (known) size of the medication package 30 and the known movement velocity (under normal conditions). Also, a contact sensor 25 can ascertain whether the medication package was moved completely over it; if this is the case, the sensor is contact-free again after the medication package 30 is moved past completely.

As a result of the sagging of the shelf base 11, the check has a negative result, however, so that an edge 11", 11''' of the shelf base 11, on which the medication package 30 is stored, is ascertained using the sensor 23.

For this purpose, in the exemplary embodiment shown, firstly the medication package 30 is again pushed using the gripping device 22 far enough into the shelf compartment that the top edge 11" of the shelf base is free (and therefore detectable). It is described with reference to FIGS. 3a-3c how this can be carried out in detail. In another embodiment, the pushing back of the medication package 30 can be omitted; since the top edge 11" is then not detectable as usual, the operating device 20 may be moved downward until the bottom edge 11' of the shelf base 11 can be ascertained on the basis of the characteristic signal.

After the medication package has been pushed into the shelf compartment, the operating device is moved downward (along the Z axis) until the signal characterizing the top edge 11" is ascertained (FIG. 1e), using which the actual value (in relation to the Z axis) of the top edge 11" can be determined.

As soon as the edge 11", 11''' is ascertained, the operating device 20 is moved to a correspondingly corrected shelf position (FIG. 1f) and the medication package is retrieved (see above). The corrected shelf position is ascertained on the basis of special structural conditions (for example, shelf base thickness, actual value for the edge, construction of operating device).

Figure 4:
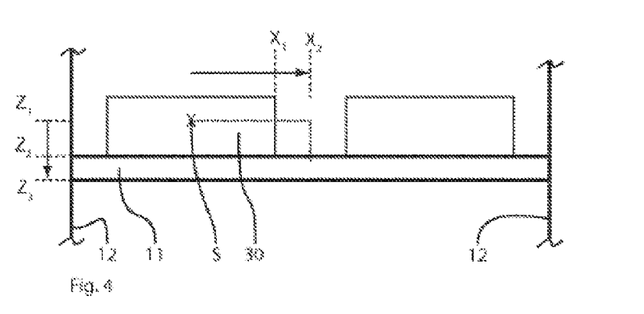
FIG. 4 shows a further embodiment of a method according to the disclosure.

If pushing back of the medication package is not to be carried out, an ascertainment of the top edge 11" can be carried out as shown in FIG. 4. The point S shows the point of incidence of the measurement beam of the sensor 23 on the medication package 30 according to the position of the medication package 30 shown in FIG. 1c, i.e., pressing against the end side or end face of the support 21. The operating device 20 is moved horizontally (X axis or X direction) with the sensor 23, wherein the measurement beam of the sensor 23 runs along the dotted line over the medication package 30. As soon as the measurement beam is guided over the edge of the medication package (at X position $X_1$) by the movement of the operating device 20, a greater distance is suddenly ascertained (state change in the case of binary distance measurement), since the sensor, after overshooting the $X_1$ position, measures the distance to the shelf wall 16 or a medication package 30 behind the medication package, which presses against the end face of the support 21. The sensor 23 has now detected a region adjacent to the medication package 30 and the operating device 20 is then moved downward, wherein the pathway of the measurement beam of the sensor 23 is again identified with a dotted line. As soon as the measurement point, proceeding from the Z position $Z_1$, reaches the Z position $Z_2$, a sudden change of the measured distance again occurs, specifically when the measurement beam is incident on the top edge 11" of the shelf base 11. This is ascertained as the signal characterizing the top edge 11" of the shelf base 11. As soon as the characterizing signal has been ascertained, the actual position of the top edge 11" of the shelf base 11 is known and, based on this actual position, the operating device 20 is moved to a shelf position at which the medication package can be retrieved, wherein the "return" in the horizontal direction is dependent on how far the operating device may be moved to detect the region adjacent to the medication package.

Figure 1D:
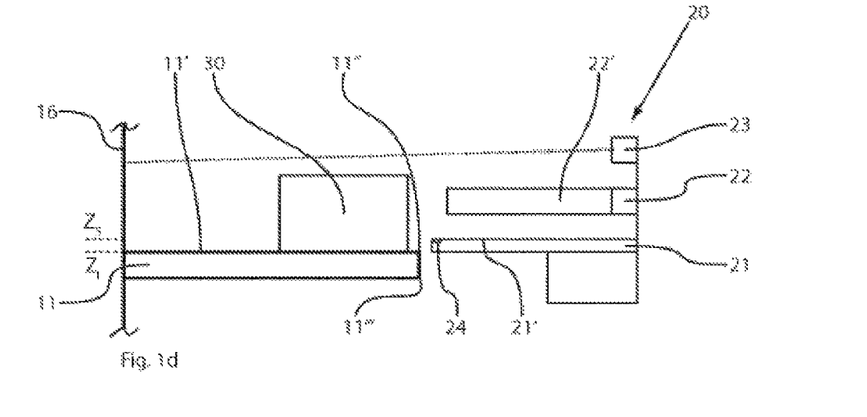
Figure 1E:
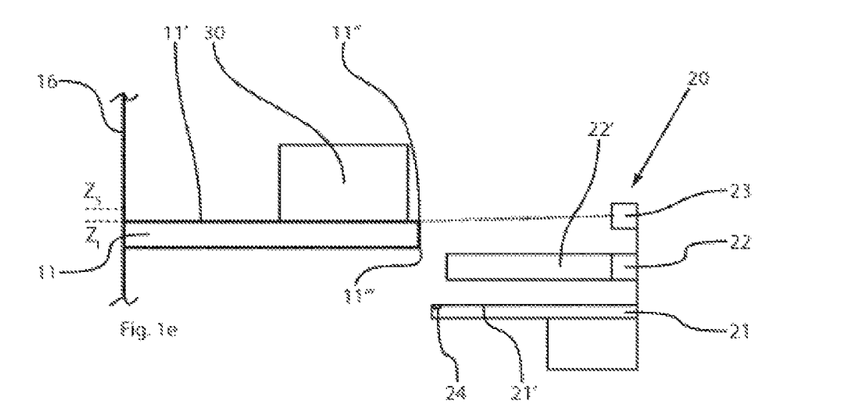
Figure 1F:
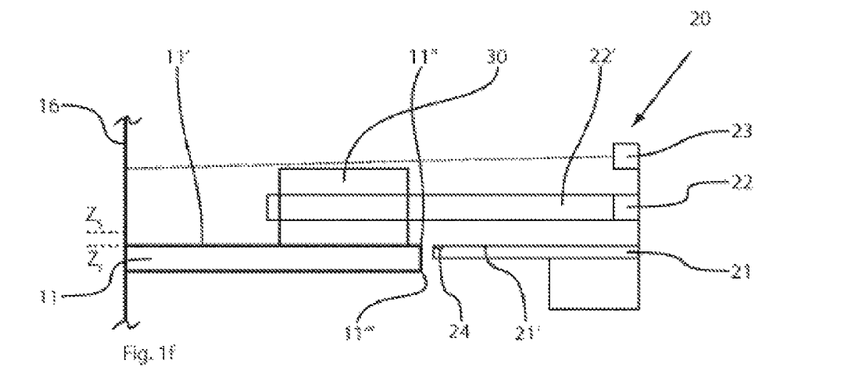

As soon as the operating device is moved into the corresponding shelf position, as shown in FIG. 1d, the medication package 30 is moved by the gripping units 22' of the gripping device 22 onto the support 21 of the operating device 20, wherein this movement of the medication package 30 can also be monitored using the sensor. As soon as the medication package has been moved onto the support 21, it is moved using the operating device 20 to a delivery location in the pharmacy order-picking device.

Still a further embodiment is indicated in FIG. 4, in which the operating device is moved further downward after the ascertainment of the top edge 11" at the $Z_2$ position, to ascertain the bottom edge 11''' of the shelf base 11 at the $Z_3$ position. The thickness of the shelf base can be ascertained from the ascertained values for the $Z_2$ and the $Z_3$ positions, and this value can be used for a plausibility check (the medication package is only retrieved if the value for the thickness of the shelf base corresponds to a target value).

As can be inferred from FIG. 1c, inter alia, the medication package 30 presses against the end side or end face of the support 21 during a method step. In the above-described embodiment of the method, the operating device is firstly moved horizontally and then vertically proceeding from this method step. As a result of the contact of the medication package 30 on the end side of the support 21, the horizontal movement of the operating device can be disturbed, or the horizontal movement can push the medication package on the shelf base, which makes a later retrieval more difficult or impossible.

To avoid this, in one embodiment of the method, the medication package 30, after it has been established that the medication package 30 has not been moved completely onto the support 21, can be pushed back into the shelf compartment using the gripping device 22. This is shown in FIGS. 3a-3c, wherein the starting situation shown in FIG. 3a approximately corresponds to FIG. 1c, i.e., the medication package 30 presses against the end side of the support 21 (reference signs were left out in FIGS. 3b and 3c for the sake of clarity).

Figure 3A:
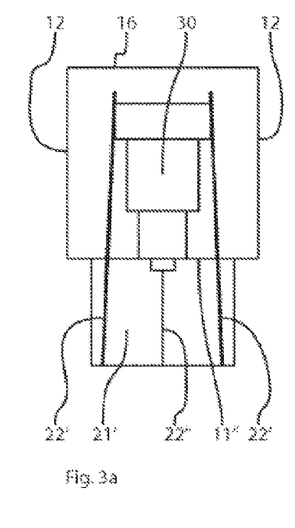
FIGS. 3a-3c show a further embodiment of a method according to the disclosure.
Figures 3B, 3C:
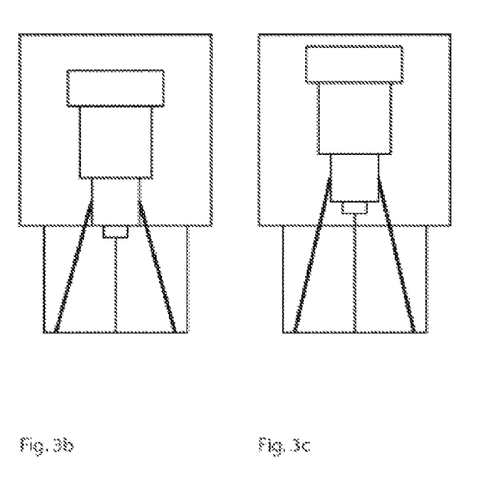

In the exemplary embodiment shown in FIGS. 3a-3c, three medication packages are to be retrieved. The movement back of the medication packages 30 can be carried out using the gripping units 22' (clamping jaws) or the gripping unit 22" (suction gripper or pusher). In the first-mentioned case, the medication package, which presses against the end face of the support 21, may be gripped using the gripping units 22'. All medication packages are then pushed back into the row of shelves via these gripping units. If the gripping unit 22" (suction gripper) is used, it is unimportant how many medication packages are to be pushed back into the shelf surface.

After the medication packages have been pushed back into the shelf surface, it is no longer necessary to move the operating device 20 horizontally to ascertain the top edge 11" of the shelf base 11, since a distance jump medication package/top edge of shelf base would now again be generated. To ascertain the top edge the shelf base, it is sufficient to move the operating device downward until the signal characterizing the top edge is ascertained, and optionally to adjust the operating device for the retrieval, wherein this subsequent adjustment (as also in all other embodiments) is dependent on the precise structural embodiment of the operating device 20. For example, upon the ascertainment of the signal characteristic for the top edge, if the surface of the shelf base is still arranged lower than the support, readjustment may be performed.

FIGS. 2a-2f illustrate a further embodiment of a method, wherein the structural features of the pharmacy order-picking device are only schematically illustrated. The embodiment shown here is suitable for operating devices in which the sensor 23 is installed below the support 21. The embodiment shown differs only slightly from that shown in FIGS. 1a-1f, so that a detailed description will be omitted to avoid unnecessary repetitions.

Figure 2A:
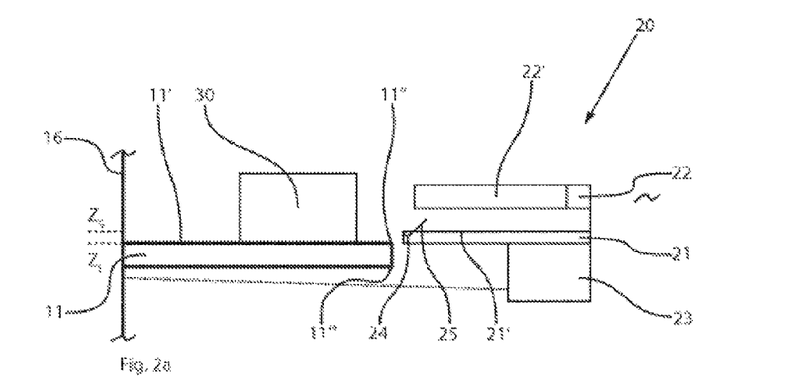
FIGS. 2a-2f show a further embodiment of a method according to the disclosure.
Figure 2B:
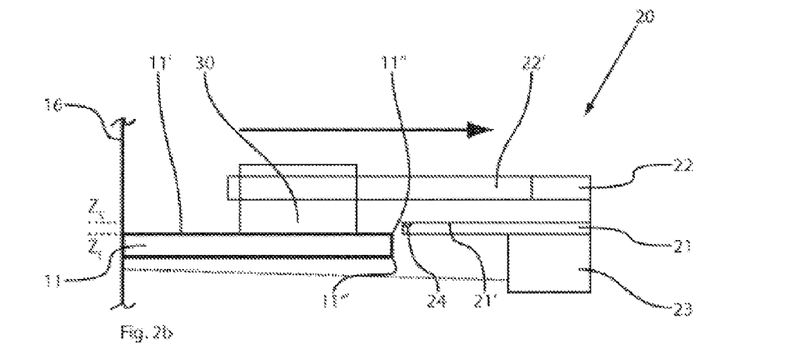
Figure 2C:
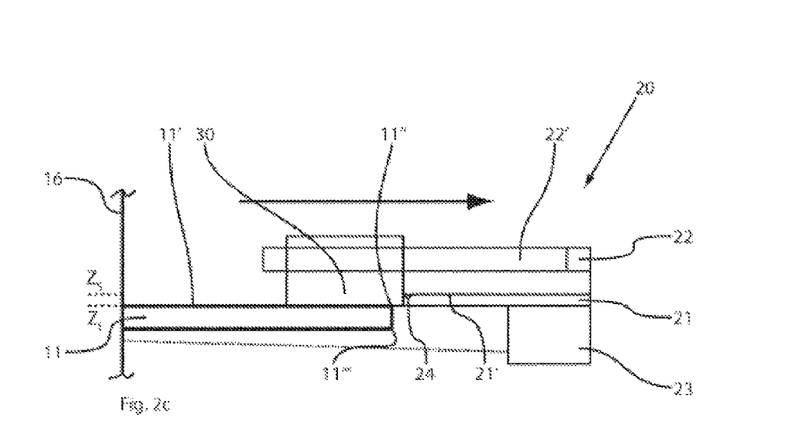
Figure 2D:
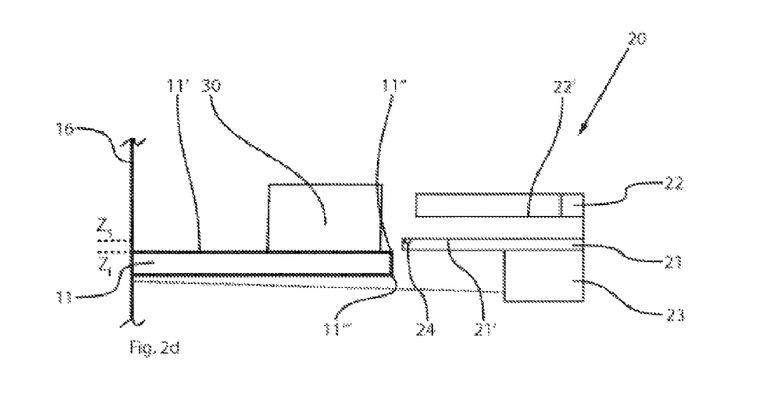
Figure 2E:
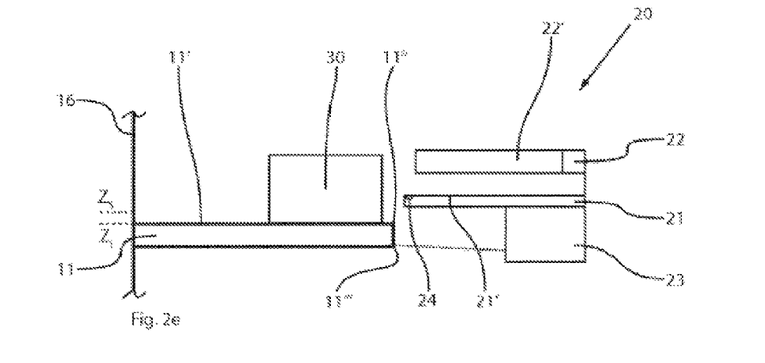
Figure 2F:
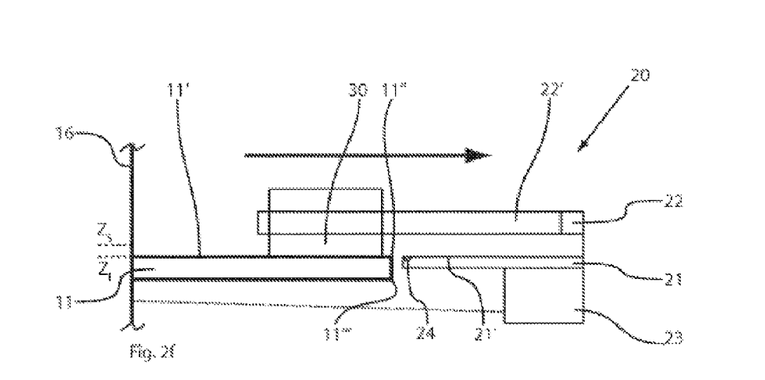

The operating device 20 is firstly moved in a movement setting to a predefined shelf position (FIG. 2a), in which retrieval is to be performed. For the retrieval, the medication package 30 is moved using the gripping device 22 on the shelf base 11 toward the support 21 of the operating device (FIG. 2b). It is then checked whether the medication package 30 was moved onto the support (for details, see description of FIGS. 1a-1f) and if this is not the case, the medication package 30 is pushed back using the gripping device 22 into the shelf compartment (FIG. 2d), to thus prevent the medication package from being pushed during a following movement of the operating device upward. With activated sensor 23 (measurement beam is illustrated as a dotted line), the operating device is then moved "upward" (in relation to the Z axis), until a signal characterizing the bottom edge 11''' (for greater detail, see above) is ascertained using the sensor 23 (FIG. 2e). As soon as the signal is ascertained, the operating device is moved downward by a specific value into a correspondingly corrected shelf position (FIG. 2f), wherein the value is dependent on the structural details of the operating device 20 and the thickness of the shelf base.

Figure 5A:
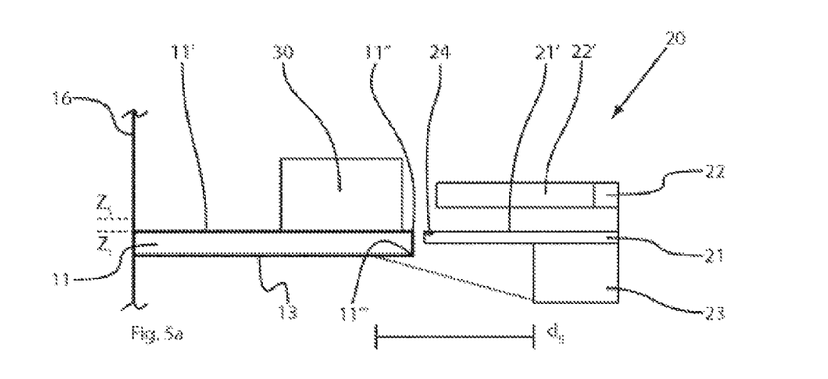
FIGS. 5a and 5b show an embodiment of an alternative method according to the disclosure.
Figure 5B:
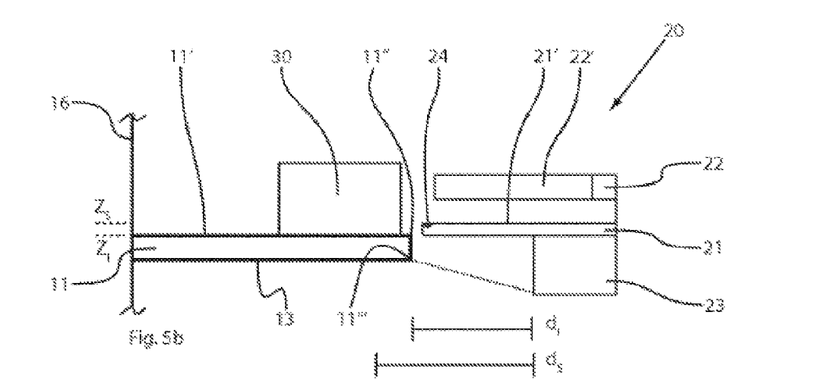

FIGS. 5a and 5b show an embodiment of an alternative method for retrieving medication packages from a pharmacy order-picking device. The pharmacy order-picking device includes a row of shelves having in each case a plurality of shelf bases 11 extending in a horizontal direction and a plurality of shelf walls extending in a vertical direction, wherein the shelf bases and the shelf walls form a plurality of shelf compartments. An operating device 20 which is movable horizontally and vertically is arranged in front of the row of shelves, said operating device comprising a gripping device 22, a sensor 23, and a support 21 having a support surface 21', wherein the sensor 23 is arranged below the support 21.

The operating device 20 is firstly moved in a movement setting to a predefined shelf position, at which the at least one medication package is to be retrieved. Before, in contrast to some methods, the medication package is retrieved, the distance $A_I$ between the sensor 23 and the bottom side 13 of the shelf base 11 is ascertained in any case using the sensor 23 (the measurement beam is again shown as a dotted line). The "distance" between the sensor and the bottom side 13 of the shelf base is in relation to the point of incidence of the measurement beam on the bottom side 13 of the shelf base, which changes in relation to the shelf base upon displacement of the operating device (and therefore of the sensor). In FIGS. 5a and 5b, this is illustrated with distances $d_I$ and $d_D$ projected on the X axis, wherein these values do not reproduce the actual distance.

The distance $A_I$ is compared to a target value for the distance between the sensor 23 and the bottom side 13 of the shelf base 11. It can be determined on the basis of the deviation from the target value to what extent the horizontal alignment between the shelf base and the support surface 21' is disturbed. If a deviation which exceeds a limiting value is not established, the medication package 30 can be retrieved using the gripping device 22 (FIG. 5a).

However, if a deviation is established, which possibly will prevent a retrieval as a result of the sagging of the shelf base (FIG. 5b), the operating device 20 is moved downward by a corresponding amount to a corrected shelf position and the at least one medication package 30 is moved on the shelf base 11 in the direction of support 21 using the gripping device 22.

The invention claimed is:

1. A method for retrieving medication packages from a pharmacy order-picking device, the method comprising:
    providing a pharmacy order-picking device comprising:
        at least one row of shelves, each row comprising a plurality of shelf bases extending in a horizontal direction and a plurality of shelf walls extending in a vertical direction,
        at least one operating device movable horizontally and vertically in front of the row of shelves, wherein the operating device comprises:
            a gripping device for placement and/or retrieval of medication packages on or from the shelf bases, respectively,
            a sensor, and
            a support having a support surface,
    moving the operating device in a movement setting, to a predefined shelf position,
    moving the at least one medication package on the shelf base associated with the shelf position in the direction of the support using the gripping device,
    checking whether the at least one medication package has been moved completely onto the support, and
    if the check has a negative result, ascertaining, using the sensor, an edge of the shelf base, on which the at least one medication package is stored, and moving the operating device to a corresponding shelf position, wherein the gripping device is in the movement setting.

2. The method of claim 1, wherein the edge of the shelf space comprises a top edge of the shelf base, and wherein moving the operating device to a corresponding shelf position comprises:
    moving the operating device horizontally until the sensor detects a region adjacent to the at least one medication package to be retrieved,
    moving the operating device downward until a signal characterizing the top edge of the shelf base is ascertained using the sensor, and
    moving the operating device to the corresponding shelf position, at which the medication package is retrieved.

3. The method of claim 1, wherein the edge of the shelf space comprises a bottom edge of the shelf base and wherein moving the operating device to the corresponding shelf position comprises:
    vertically moving the operating device until a signal characterizing the bottom edge of the shelf base is ascertained using the sensor, and
    moving the operating device to the corresponding shelf position, at which the medication package is retrieved.

4. The method of claim 1, wherein ascertaining the edge of the shelf base comprises:
    ascertaining, using the sensor, an actual value of the edge of the shelf base,
    comparing the actual value to a target value to determine an ascertained deviation, and
    wherein moving the operating device to a corresponding shelf position comprises vertically moving the operating device by a value corresponding to the ascertained deviation.

5. The method of claim 1, wherein the operating device is moved such that the support surface is horizontally aligned with or is arranged lower by an amount Z than a shelf base surface of the shelf base, on which the at least one medication package to be retrieved is stored.

6. The method of claim 1, wherein checking whether the at least one medication package has been moved completely onto the support comprises ascertaining the length of the at least one medication package moved onto the support using a second sensor and comparing it to a target value, wherein a deviation from a target value indicates that the at least one medication package was not moved completely onto the support.

7. The method of claim 1, wherein checking whether the at least one medication package was moved completely onto the support comprises checking, using a second sensor, whether the at least one medication package was guided past the second sensor.

8. The method of claim 2, further comprising:
    responsive to ascertaining the signal characterizing the top edge of the shelf base, moving the operating device further downward,
    ascertaining a signal characterizing the bottom edge, and
    carrying out a plausibility check based on the ascertained signals, and if the plausibility check is positive, moving the operating device to a shelf position corresponding to the top edge of the shelf base.

9. The method of claim 1, further comprising:
    moving the at least one medication package away from the support using the gripping device, wherein the at least one medication package has no contact with the end face of the support, when the check as to whether the at least one medication package has been moved completely onto the support has a negative result.

10. The method of claim 1, further comprising:
ascertaining that the check as to whether the at least one medication package has been moved completely onto the support has a negative result,
moving the at least one medication package away from the support using the gripping device such that the top edge of the shelf base is released, before the gripping device is moved into the movement setting,
moving the operating device downward until a signal characterizing the top edge of the shelf base is ascertained using the sensor, moving the operating device to the corresponding shelf position, and retrieving the at least one medication package.

11. A method for retrieving medication packages from a pharmacy order-picking device, the method comprising:
providing a pharmacy order-picking device comprising:
at least one row of shelves, each row comprising a plurality of shelf bases extending in a horizontal direction and a plurality of shelf walls extending in a vertical direction,
at least one operating device movable horizontally and vertically in front of the row of shelves, wherein the operating device comprises:
a gripping device for storage or retrieval of medication packages on or from the shelf bases, respectively,
a support having a support surface, and
a sensor arranged under the support,
moving the operating device in a movement setting, to a predefined shelf position, at which the at least one medication package is to be retrieved from a corresponding shelf base having a bottom side,
ascertaining the distance $A_I$ to the bottom side of the shelf base using the sensor,
comparing the distance $A_I$ to a target value for a distance between the sensor and the bottom side of the shelf base, and,
if a deviation between the ascertained distance $A_I$ and the target value $A_S$ exceeds a limiting value, moving the operating device vertically by a corresponding amount to a corrected shelf position and moving the at least one medication package on the shelf base associated with the shelf position in the direction of the support using the gripping device.

12. The method for retrieving medication packages as claimed in claim 1, wherein the sensor is arranged above the support.

13. The method for retrieving medication packages as claimed in claim 1, wherein the sensor is arranged below the support.

14. The method for retrieving medication packages as claimed in claim 6, wherein ascertaining the length of the at least one medication package is based on a known movement velocity of the gripping device.

15. The method for retrieving medication packages as claimed in claim 7, wherein the second sensor is located on the support surface and is in contact with the at least one medication package when the at least one medication package is above it, and
wherein checking whether the at least one medication package was moved completely onto the support comprises determining whether the second sensor is not in contact with the at least one medication package after having been in contact with the at least one medication package.

16. A method for retrieving medication packages, the method comprising:
moving an operating device to a predefined shelf position, the operating device being in a movement setting, and the operating device comprising a support, a gripping device, and a sensor;
moving at least one medication package on a shelf base associated with the shelf position in the direction of a support using the gripping device,
checking whether the at least one medication package has been moved completely onto the support, and
if the at least one medication package has not been moved completely onto the support, ascertaining, using the sensor, an edge of the shelf base, on which the at least one medication package is stored, and moving the operating device to a corresponding shelf position, wherein the gripping device is in the movement setting,
wherein the movement setting comprises retracting the gripping device.

17. The method for retrieving medication packages of claim 16, wherein the edge of the shelf base is a top edge of the shelf base and wherein moving the operating device to a corresponding shelf position comprises:
moving the operating device horizontally by a distance in a first direction until the sensor detects a region adjacent to the at least one medication package to be retrieved;
moving the operating device downward until the top edge of the shelf base is ascertained using the sensor;
moving the operating device horizontally by the distance in a second direction, opposite the first direction; and
retrieving the at least one medication package.

18. The method for retrieving medication packages of claim 17, wherein the region adjacent to the at least one medication package to be received is a second medication package.

19. The method for retrieving medication packages of claim 17, wherein the region adjacent to the at least one medication package to be received is a wall.

20. The method for retrieving medication packages of claim 17, wherein ascertaining the edge of the shelf base comprises detecting a state change in a binary distance measurement.

* * * * *